United States Patent
Manole

(10) Patent No.: US 7,600,390 B2
(45) Date of Patent: Oct. 13, 2009

(54) METHOD AND APPARATUS FOR CONTROL OF CARBON DIOXIDE GAS COOLER PRESSURE BY USE OF A TWO-STAGE COMPRESSOR

(75) Inventor: Dan M Manole, Tecumseh, MI (US)

(73) Assignee: Tecumseh Products Company, Ann Arbor, MI (US)

( * ) Notice: Subject to any disclaimer, the term of this patent is extended or adjusted under 35 U.S.C. 154(b) by 458 days.

(21) Appl. No.: 11/145,661

(22) Filed: Jun. 6, 2005

(65) Prior Publication Data

US 2006/0086110 A1 Apr. 27, 2006

Related U.S. Application Data

(60) Provisional application No. 60/620,983, filed on Oct. 21, 2004.

(51) Int. Cl.
F25B 49/00 (2006.01)
F25B 1/00 (2006.01)
F25B 43/00 (2006.01)

(52) U.S. Cl. .................. 62/228.1; 62/510; 62/513

(58) Field of Classification Search .................. 62/113, 62/175, 228.1, 228.4, 228.5, 510, 513
See application file for complete search history.

(56) References Cited

U.S. PATENT DOCUMENTS

| | | | | |
|---|---|---|---|---|
| 3,668,883 A * | 6/1972 | Ruff et al. | ...... | 62/158 |
| 3,675,441 A | 7/1972 | Perez | ...... | 62/278 |
| 4,006,602 A | 2/1977 | Fanberg | ...... | 62/113 |
| 4,048,814 A | 9/1977 | Quack | ...... | 62/335 |
| 4,062,188 A | 12/1977 | Cutler et al. | ...... | 60/599 |
| 4,254,637 A | 3/1981 | Brauch et al. | ...... | 62/468 |
| 4,559,786 A | 12/1985 | Schuck | ...... | 62/55 |
| 4,594,858 A | 6/1986 | Shaw | ...... | 62/175 |
| 4,947,655 A * | 8/1990 | Shaw | ...... | 62/200 |
| 5,094,085 A | 3/1992 | Irino | ...... | 62/175 |
| 5,142,872 A | 9/1992 | James et al. | ...... | 62/50.5 |

(Continued)

FOREIGN PATENT DOCUMENTS

EP 0 908 688 4/1999

(Continued)

OTHER PUBLICATIONS (*) = English language abstract only.

*Primary Examiner*—Marc E Norman
(74) *Attorney, Agent, or Firm*—Baker & Daniels LLP

(57) ABSTRACT

A transcritical vapor compression system includes a fluid circuit circulating a refrigerant in a closed loop. The fluid circuit has operably disposed therein, in serial order, a first compressor, an intercooler, a second compressor with a variable capacity, a first heat exchanger, an expansion device and a second heat exchanger. The first compressor compresses the refrigerant from a low pressure to an intermediate pressure. The second compressor compresses the refrigerant from the intermediate pressure to a supercritical pressure. The first heat exchanger is positioned in a high pressure side of the fluid circuit. The second heat exchanger is positioned in a low pressure side of the fluid circuit. The expansion device reduces the pressure of the refrigerant from a supercritical pressure to a relatively lower pressure. Cooling means cools the refrigerant within one of the compressors.

5 Claims, 5 Drawing Sheets

U.S. PATENT DOCUMENTS

| | | | |
|---|---|---|---|
| 5,180,293 A | 1/1993 | Hartl | 417/366 |
| 5,394,709 A | 3/1995 | Lorentzen | 62/402 |
| 5,465,581 A | 11/1995 | Haertl et al. | 62/50.1 |
| 5,685,160 A | 11/1997 | Abersfelder et al. | 62/114 |
| 5,768,911 A | 6/1998 | Dube | 62/505 |
| 5,927,088 A | 7/1999 | Shaw | 62/175 |
| 6,178,761 B1 | 1/2001 | Karl | 62/159 |
| 6,182,456 B1 | 2/2001 | Yamaguchi et al. | 62/222 |
| 6,216,477 B1 | 4/2001 | Dienhart et al. | 62/217 |
| 6,298,674 B1 | 10/2001 | Finkenberger et al. | 62/115 |
| 6,341,496 B1 | 1/2002 | Kettner et al. | 62/225 |
| 6,385,980 B1 | 5/2002 | Sienel | 62/174 |
| 6,481,216 B2 | 11/2002 | Simmons et al. | 62/6 |
| 6,484,519 B1 | 11/2002 | Hesse et al. | 62/116 |
| 6,516,626 B2 | 2/2003 | Escobar et al. | 62/434 |
| 6,523,360 B2 | 2/2003 | Watanabe et al. | 62/204 |
| 6,574,978 B2 | 6/2003 | Flynn et al. | 62/278 |
| 7,111,471 B2 * | 9/2006 | Yamasaki et al. | 62/228.4 |
| 2002/0007637 A1 | 1/2002 | Simmons et al. | 62/6 |
| 2003/0074913 A1 | 4/2003 | Ebara | 62/271 |
| 2003/0177782 A1* | 9/2003 | Gopalnarayanan et al. | 62/505 |
| 2005/0279127 A1* | 12/2005 | Jia et al. | 62/510 |

FOREIGN PATENT DOCUMENTS

| | | |
|---|---|---|
| EP | 1 057 669 | 12/2000 |
| EP | 1 462 738 | 9/2004 |
| JP | 2002/195673 | 7/2002 |
| JP | 2003-74997 | 3/2003 |

* cited by examiner

METHOD AND APPARATUS FOR CONTROL OF CARBON DIOXIDE GAS COOLER PRESSURE BY USE OF A TWO-STAGE COMPRESSOR

This application claims the benefit under Title 35, U.S.C. §119(e) of U.S. Provisional Patent Application Ser. No. 60/620,983, entitled METHOD AND APPARATUS FOR CONTROL OF CARBON DIOXIDE GAS COOLER PRESSURE BY USE OF A TWO-STAGE COMPRESSOR, filed on Oct. 21, 2004.

CROSS-REFERENCE TO RELATED APPLICATION

This application is related to and claims the benefit under 35 U.S.C. §119(e) of U.S. Provisional Patent Application Ser. No. 60/620,983, filed Oct. 21, 2004.

BACKGROUND OF THE INVENTION

1. Field of the Invention

The present invention relates to vapor compression systems and, more particularly, to a transcritical multi-stage vapor compression system in which the efficiency and capacity can be adjusted.

2. Description of the Related Art

Vapor compression systems are used in a variety of applications including heat pump, air conditioning, and refrigeration systems. Such systems typically employ working fluids, or refrigerants, that remain below their critical pressure throughout the entire vapor compression cycle. Some vapor compression systems, however, such as those employing carbon dioxide as the refrigerant, typically operate as transcritical systems wherein the refrigerant is compressed to a pressure exceeding its critical pressure and wherein the suction pressure of the refrigerant is less than the critical pressure of the refrigerant. The basic structure of such a system includes a compressor for compressing the refrigerant to a pressure that exceeds its critical pressure. Heat is then removed from the refrigerant in a first heat exchanger, e.g., a gas cooler. The pressure of the refrigerant discharged from the gas cooler is reduced in an expansion device and then converted to a vapor in a second heat exchanger, e.g., an evaporator, before being returned to the compressor.

FIG. 1 illustrates a typical transcritical vapor compression system 10. A compression mechanism 12 compresses the refrigerant from a suction pressure to discharge pressure that exceeds the critical pressure of the refrigerant. The refrigerant is then cooled in a gas cooler 14. In the illustrated example, a suction line heat exchanger 16 further cools the high pressure refrigerant before the pressure of the refrigerant is reduced by expansion device 18. The refrigerant then enters evaporator 20 where it is boiled and cools a secondary medium, such as air, that may be used, for example, to cool a refrigerated cabinet. The refrigerant discharged from the evaporator 20 passes through the suction line heat exchanger 16 where it absorbs thermal energy from the high pressure refrigerant before entering the compression mechanism to repeat the cycle.

In practice, the cooling load requirement varies during the operation of the refrigeration system. If the refrigeration system operates with excess cooling capacity, then its efficiency is less than optimal. The cooling capacity, and thus the efficiency, of a carbon dioxide refrigeration system can be modulated by varying the gas cooler pressure. The pressure of the carbon dioxide refrigerant in the gas cooler is a parameter that is very important to the efficiency and cooling capacity of the refrigeration system. The amount of carbon dioxide refrigerant in components operating at the supercritical pressure, e.g., gas cooler 14 and suction line heat exchanger 16, varies with the gas cooler pressure. However, the amount of refrigerant existing at any instant in time in the evaporator and other components of the refrigeration system varies little with changes in gas cooler pressure. The difference between carbon dioxide and other refrigerants is that the density of the supercritical carbon dioxide varies much more than the density of commonly used subcritical refrigerants that are in liquid phase in the condenser and the suction line heat exchanger.

It is desirable to ensure constant thermodynamic parameters, such as temperature and pressure, at the suction of the first stage compressor. Those parameters are used in designing the evaporator, suction line heat exchanger, thermostatic expansion valves, compressor internal heat transfer, oil separator, accumulator, etc. A constant temperature and pressure for the vapors entering the compressor results in the vapors entering the compressor having a constant density. The constant density of the vapors, in turn, results in the compressor having a fixed displacement volume and pumping with a constant mass flow rate. The design of the various components of the refrigeration system is simplified by these parameters being constant.

What is needed in the art is an apparatus for adjusting the efficiency and capacity of a transcritical multi-stage vapor compression system, while keeping the pressure and temperature at the input of the compressor constant.

SUMMARY OF THE INVENTION

The present invention provides a transcritical vapor compression system which includes two compressor stages, the first stage compressor having non-variable capacity and the second stage compressor having a variable capacity wherein, as the capacity of the second stage compressor is changed to alter the system capacity, the temperature and pressure of the refrigerant at the inlet to the first stage compressor is maintained substantially constant. An intercooler between the two compressor stages is used to maintain a substantially constant refrigerant temperature at the inlet of the second compressor stage while allowing the intermediate pressure to vary.

The invention comprises, in one form thereof, a transcritical vapor compression system including a fluid circuit circulating a refrigerant in a closed loop. The fluid circuit has operably disposed therein, in serial order, a first compressor, an intercooler, a second compressor with a variable capacity, a first heat exchanger, an expansion device and a second heat exchanger. The first compressor compresses the refrigerant from a low pressure to an intermediate pressure. The second compressor compresses the refrigerant from the intermediate pressure to a supercritical pressure. The first heat exchanger is positioned in a high pressure side of the fluid circuit. The second heat exchanger is positioned in a low pressure side of the fluid circuit. The expansion device reduces the pressure of the refrigerant from a supercritical pressure to a relatively lower pressure. Cooling means cools the refrigerant within one of the compressors.

The present invention comprises, in another form thereof, a transcritical vapor compression system including a fluid circuit circulating a refrigerant in a closed loop. The fluid circuit has operably disposed therein, in serial order, a first compressor, a second compressor with a variable capacity, a first heat exchanger, an expansion device and a second heat exchanger. The first compressor compresses the refrigerant from a low pressure to an intermediate pressure. The second compressor compresses the refrigerant from the intermediate pressure to a supercritical pressure. The first heat exchanger is positioned in a high pressure side of the fluid circuit and the second heat exchanger is positioned in a low pressure side of the fluid circuit. Cooling means cools the refrigerant between the compressors or within one of the compressors.

The present invention comprises, in yet another form thereof, a transcritical vapor compression system including a fluid circuit circulating a refrigerant in a closed loop. The fluid circuit has operably disposed therein, in serial order, a first compressor, a second compressor, a first heat exchanger, an expansion device and a second heat exchanger. The first compressor compresses the refrigerant from a low pressure to an intermediate pressure. The second compressor compresses the refrigerant from the intermediate pressure to a supercritical pressure. Cooling means cools the refrigerant within one of the compressors.

The present invention comprises, in a further form thereof, a method of controlling a transcritical vapor compression system, including providing a fluid circuit circulating a refrigerant in a closed loop. The fluid circuit has operably disposed therein, in serial order, a first compressor, an intercooler, a second compressor, a first heat exchanger, an expansion device and a second heat exchanger. The refrigerant is compressed from a low pressure to an intermediate pressure in the first compressor. The refrigerant is compressed from the intermediate pressure to a supercritical pressure in the second compressor. A temperature of the refrigerant is decreased in the first heat exchanger. The refrigerant is passed through the expansion device and the pressure of the refrigerant is reduced therein. A capacity of the second compressor is varied to thereby regulate a capacity and/or an efficiency of the system.

An advantage of the present invention is that the capacity and efficiency of the system can be regulated while keeping constant the pressure and temperature at the input of the first compressor.

Another advantage is that the gas pressure within the gas cooler can be controlled without modifying the amount of carbon dioxide charge in the system. Thus, expensive and possibly leaky connections to a reservoir of refrigerant are not needed.

Yet another advantage is that the efficiency and capacity of the refrigeration system can be controlled without using the intermediate pressure between the compression mechanisms as an input parameter. Thus, an expensive and possibly leaky intermediate pressure tap is not needed.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein.

Figure 2:
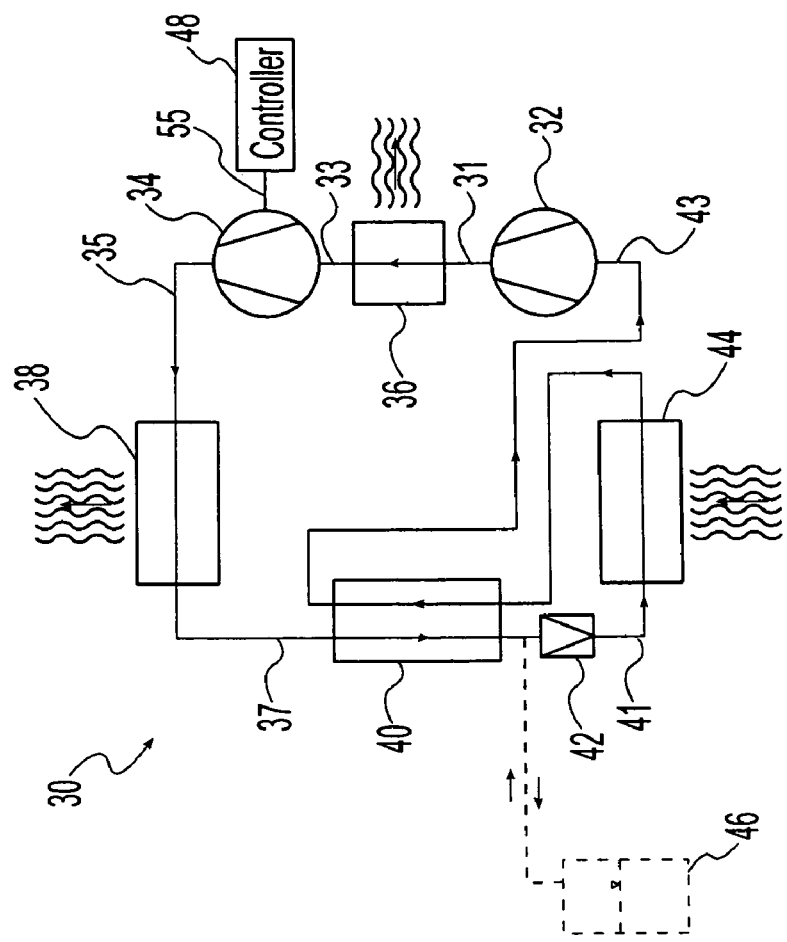
FIG. 2 is a schematic view of a vapor compression system in accordance with the present invention.
Figure 1:
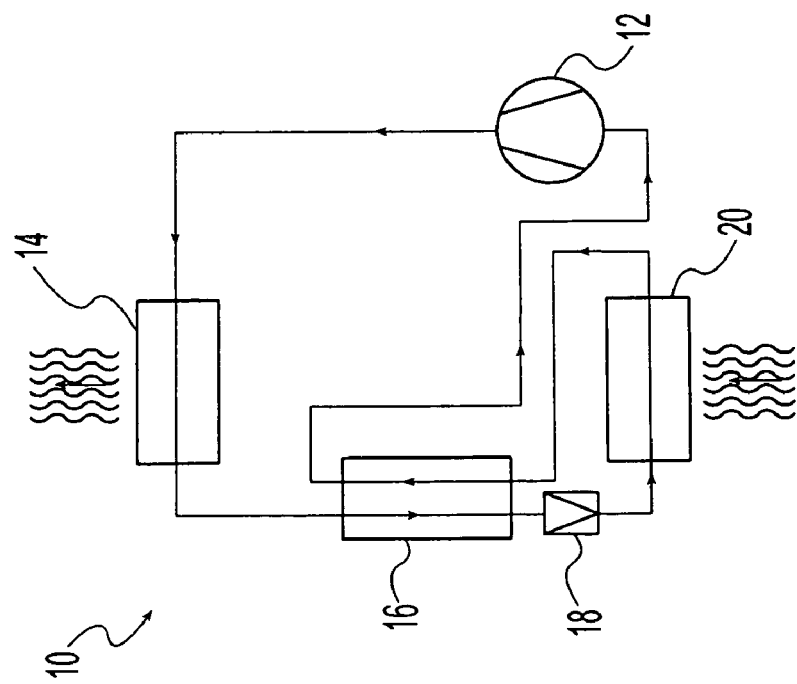
FIG. 1 is a schematic representation of a prior art vapor compression system.

Corresponding reference characters indicate corresponding parts throughout the several views. Although the exemplification set out herein illustrates an embodiment of the invention, the embodiment disclosed below is not intended to be exhaustive or to be construed as limiting the scope of the invention to the precise form disclosed.

DESCRIPTION OF THE PRESENT INVENTION

A vapor compression system 30 in accordance with the present invention is schematically illustrated in FIG. 2 including a fluid circuit circulating refrigerant in a closed loop. System 30 has a two stage compressor having a first compression mechanism 32 with a non-variable capacity and a second compression mechanism 34 with a variable capacity. First compression mechanism 32 compresses the refrigerant from a suction pressure to an intermediate pressure. An intercooler 36 is positioned between the first and second compression mechanisms and cools the intermediate pressure refrigerant. Second compression mechanism 34 then compresses the refrigerant from the intermediate pressure to a discharge pressure that exceeds the critical pressure of the refrigerant, i.e., a supercritical pressure. Compression mechanisms 32, 34 may be any suitable type of compression mechanisms such as a rotary, reciprocating or scroll-type compressor mechanisms.

The refrigerant is then cooled in a heat exchanger that can be in the form of a conventional gas cooler 38 which can cool the refrigerant discharged from compression mechanism 34. Another heat exchanger that can be in the form of a suction line heat exchanger 40 can further cool the refrigerant. The pressure of the refrigerant can be reduced from a supercritical pressure to a relatively lower pressure, preferably a subcritical pressure, by an expansion device 42.

The capacity and efficiency of such a transcritical system can be regulated by regulating the pressure of the high pressure portion, e.g., the pressure in gas cooler 38, of the system. The pressure of the high side gas cooler may, in turn, be regulated by regulating the mass of refrigerant contained therein which is dependent upon the total charge of refrigerant actively circulating through the system.

After the pressure of the refrigerant is reduced by expansion device 42, the refrigerant enters yet another heat exchanger in the form of an evaporator 44 positioned in a low pressure side of the fluid circuit. The refrigerant absorbs thermal energy in the evaporator 44 as the refrigerant is converted from a liquid phase to a vapor phase. The evaporator 44 may be of a conventional construction well known in the art. After being discharged from evaporator 44, the low or suction pressure refrigerant passes through heat exchanger 40 to cool the high pressure refrigerant. More particularly, heat exchanger 40 can exchange thermal energy between the relatively warm refrigerant at a first location in the high pressure side of the fluid circuit and the relatively cool refrigerant at a second location in the low pressure side of the fluid circuit. After thus passing through the heat exchanger 40 first on the high pressure side and then on the low pressure side of the fluid circuit, the refrigerant is returned to first compression mechanism 32 and the cycle is repeated.

Schematically represented fluid lines or conduits 31, 33, 35, 37, 41, and 43 provide fluid communication between first compression mechanism 32, intercooler 36, second compression mechanism 34, gas cooler 38, expansion device 42, evaporator 44 and compression mechanism 32 in serial order. Heat exchanger 40 exchanges thermal energy between different points of the fluid circuit that are located in that portion of the circuit schematically represented by conduits 37 and 43, cooling the high pressure refrigerant conveyed within line 37. The fluid circuit extending from the output of the compression mechanism 32 to the input of the compression mechanism 32 has a high pressure side and a low pressure side. The high pressure side extends from the output of compression mechanism 32 to expansion device 42 and includes conduit 35, gas cooler 38 and conduit 37. The low pressure side extends from expansion device 42 to compression mechanism 32 and includes conduit 41, evaporator 44 and conduit 43.

The displacement ratio is defined as the ratio between the volumetric displacement of second stage compressor 34 and the volumetric displacement of first stage compressor 32. The pressure in conduit 33 at the input to second compression mechanism 34 reaches an equilibrium during the operation of the two stage compressor such that the rate of refrigerant mass flow compressed by second compressor mechanism 34 equals the rate of refrigerant mass flow compressed by first compressor mechanism 32. The pressure of the carbon dioxide in gas cooler 38 is established according to the average temperature in gas cooler 38 and in other tubes and vessels operating at supercritical pressure, i.e., conduits 35, 37 and heat exchanger 40.

According to the present invention, the intermediate pressure between first compressor mechanism 32 and second compressor mechanism 34 is modulated when the volumetric displacement, i.e., capacity, of second compressor mechanism 34 is changed. An electrical controller 48 may be electrically connected to second compressor mechanism 34 through a conductor 55 such that controller 48 may control a voltage or current level of second compressor mechanism 34. As a consequence of the change in the intermediate pressure, the discharge temperature of second compressor mechanism 34 changes, and thus the average temperature and density of the carbon dioxide gas in the supercritical state changes. The average temperature and density of the carbon dioxide gas in the supercritical state, in turn, determines the pressure of the carbon dioxide gas in the supercritical state. Thus, controller 48 can regulate the refrigerant pressure within gas cooler 38. By changing the supercritical pressure of the carbon dioxide, the efficiency and cooling capacity of the refrigeration system can be controlled.

Figure 3:
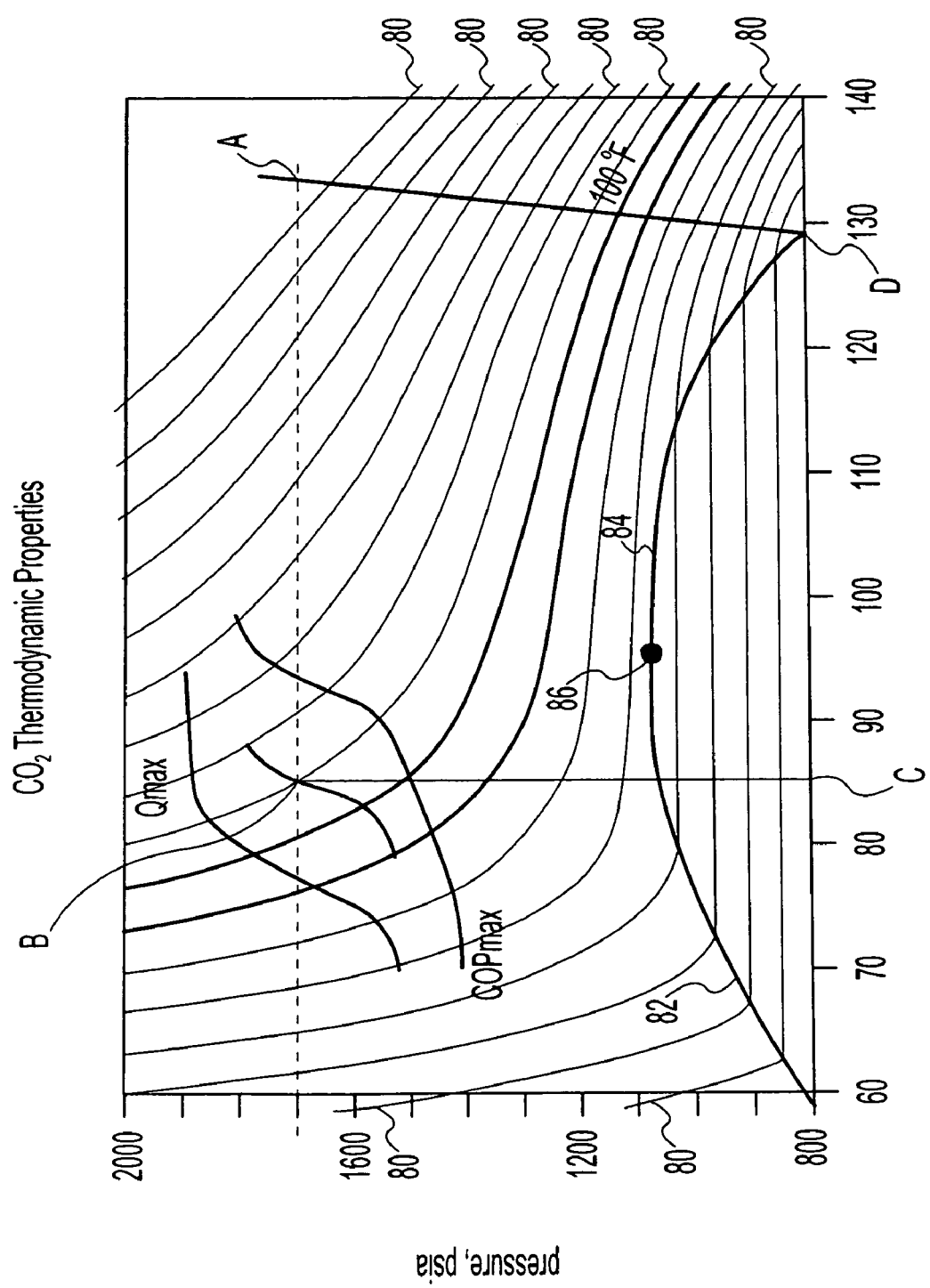
FIG. 3 is a graph illustrating the thermodynamic properties of carbon dioxide in a vapor compression system substantially identical to the vapor compression system of FIG. 2, except having a single stage compression mechanism instead of a two stage compression mechanism.

The thermodynamic properties of carbon dioxide are shown in the graph of FIG. 3. Lines 80 are isotherms and represent the properties of carbon dioxide at a constant temperature. Lines 82 and 84 represent the boundary between two phase conditions and single phase conditions and meet at point 86, a maximum pressure point of the common line defined by lines 82, 84. Point 86 is sometimes referred to as the "critical point". Line 82 represents the liquid saturation curve while line 84 represents the vapor saturation curve.

The area below lines 82, 84 represents the two phase subcritical region where boiling of carbon dioxide takes place at a constant pressure and temperature. The area above point 86 represents the supercritical region where cooling or heating of the carbon dioxide does not change the phase (liquid/vapor) of the carbon dioxide. The phase of a carbon dioxide in the supercritical region is commonly referred to as "gas" instead of liquid or vapor.

The cycle D-A-B-C-D represents the changes in carbon dioxide as it flows through a refrigeration system substantially identical to system 30, except having only a single stage compression mechanism instead of a two stage compression mechanism. The lines $Q_{max}$ and $COP_{max}$ represent gas cooler discharge values for maximizing the capacity and efficiency respectively of the system. The central line positioned therebetween represents values that provide relatively high, although not maximum, capacity and efficiency. Moreover, when the system fails to operate according to design parameters defined by this central line, the system will suffer a decrease in either the capacity or efficiency and an increase in the other value unless such variances are of such magnitude that they represent a point no longer located between the $Q_{max}$ and $COP_{max}$ lines.

Point A represents the refrigerant properties as discharged from the single stage compression mechanism (and at the inlet of a gas cooler 38). Point B represents the refrigerant properties at the inlet to expansion device 42 (if the system did not include heat exchanger 40, point B would represent the outlet of gas cooler 38). Point C represents the refrigerant properties at the inlet of evaporator 44 (or outlet of expansion device 42). Point D represents the refrigerant at the inlet to compression mechanism 32 (if the system did not include heat exchanger 40, point C would represent the outlet of evaporator 44). Movement from point D to point A represents the compression of the refrigerant in the single stage compression mechanism. As can be seen, compressing the refrigerant both raises its pressure and its temperature. Moving from point A to point B represents the cooling of the high pressure refrigerant at a constant pressure in gas cooler 38 (and heat exchanger 40). Movement from point B to point C represents the action of expansion device 42 which lowers the pressure of the refrigerant to a subcritical pressure. Movement from point C to point D represents the action of evaporator 44 (and heat exchanger 40). Since the refrigerant is at a subcritical pressure in evaporator 44, thermal energy is transferred to the refrigerant to change it from a liquid phase to a vapor phase at a constant temperature and pressure. The capacity of the system (when used as a cooling system) is determined by the mass flow rate through the system and the location of point C and the length of line C-D which in turn is determined by the specific enthalpy of the refrigerant at the evaporator inlet. Thus, reducing the specific enthalpy at the evaporator inlet without substantially changing the mass flow rate, and without altering the other operating parameters of the system, will result in a capacity increase in the system. This can be done by decreasing the temperature of the refrigerant in expansion device 42, thereby increasing both the mass and pressure of refrigerant contained in gas cooler 38. If the refrigerant in gas cooler 38 is still cooled to the same gas cooler discharge temperature, this increase in gas cooler pressure will shift line A-B upwards and move point B to the left (as depicted in FIG. 3) along the isotherm representing the outlet temperature of the gas cooler. This, in turn, will shift point C to the left and increase the capacity of the system. Similarly, by increasing the temperature of the refrigerant in expansion device 42, the mass and pressure of refrigerant contained within gas cooler 38 can be reduced to thereby reduce the capacity of the system.

Figure 4:
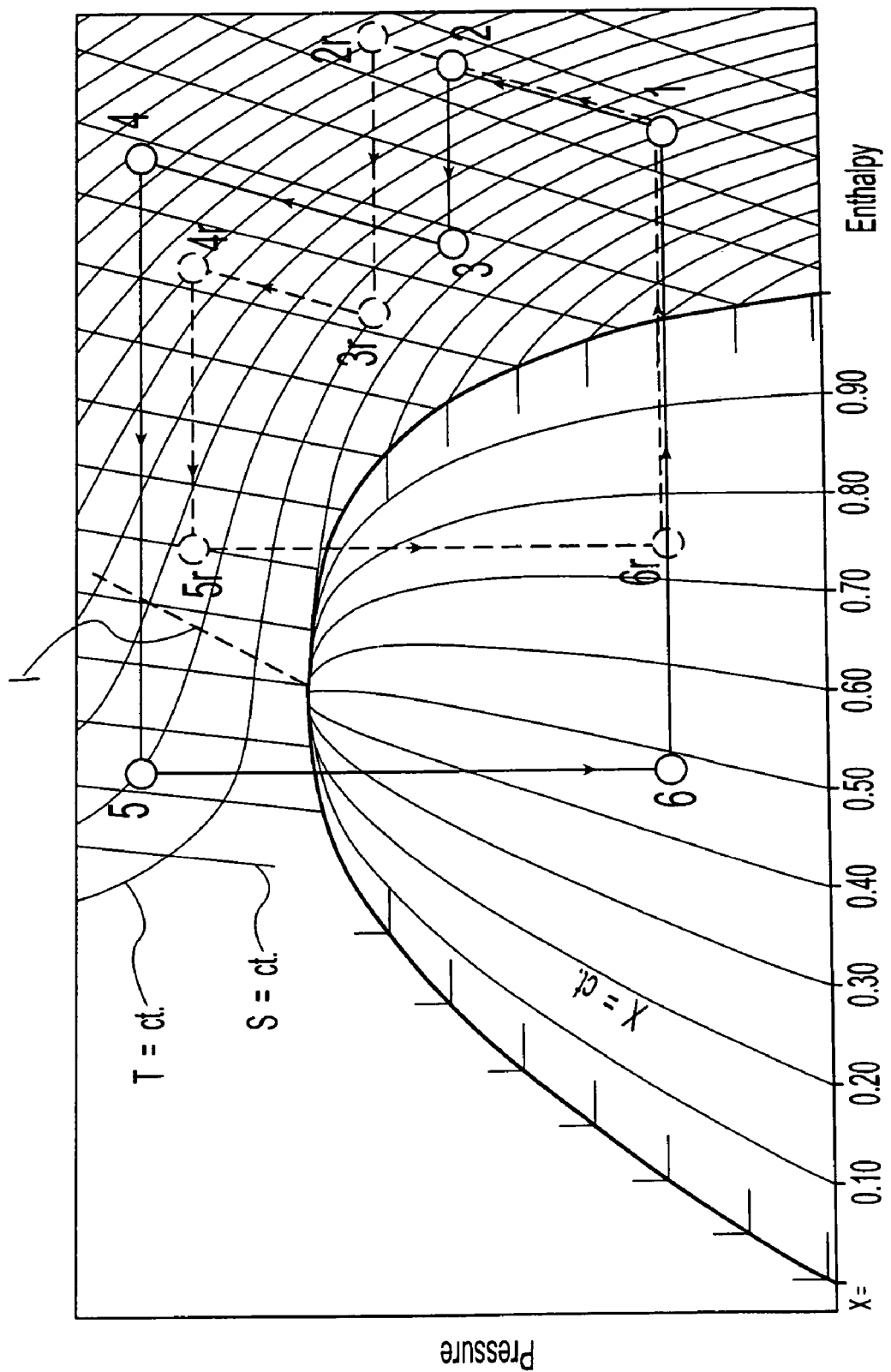
FIG. 4 is a graph illustrating changes in the thermodynamic properties of carbon dioxide as it flows in the vapor compression system of FIG. 2.

FIG. 4 illustrates the changes in carbon dioxide as it flows through refrigeration system 30, which includes a two stage compression mechanism. Movement from point 2 to point 3 represents cooling of the refrigerant in intercooler 36. The cycle represented by the dashed lines represents the effects of reducing the displacement ratio of two stage compressor 32, 34, thereby reducing the cooling capacity and increasing the efficiency of system 30. By reducing the capacity of second compression mechanism 34, the displacement ratio of two stage compressor 32, 34 is reduced, thereby reducing the cooling capacity of the system 30. More particularly, the reduction of the capacity of second compression mechanism 34 moves the operation of system 30 from the cycle 1-2-3-4-5-6-1 to the reduced cooling capacity cycle 1-2r-3r-4r-5r-6r-1.

The temperature of the carbon dioxide gas exiting intercooler 36, i.e., state 3, is shown to be unaffected by the change in the displacement ratio. That is, second stage suction thermodynamic states 3 and 3r are shown to be located on the same isotherm. The reduction in the displacement ratio does raise the intermediate pressure within intercooler 36, as represented by the higher pressure level between points 2r and 3r as compared to the pressure level between points 2 and 3. The reduction in the capacity of second compression mechanism 34 results in less suction being created at the input to second compression mechanism 34. Since the capacity of first compression mechanism 32 is unchanged, the output pressure of first compression mechanism 32 is higher as a result of the decreased suction produced by second compression mechanism 34. Thus, the intermediate pressure between compression mechanisms 32, 34 adjusts itself to a higher value. The carbon dioxide gas in thermodynamic state 3r has a higher density than in state 3, thereby offsetting, in terms of mass flow rate, the reduction in capacity of second compression mechanism 34. Thus, the mass flow rate that is compressed by the reduced displacement volume of second compression mechanism 34 equals the mass flow rate that is compressed by first compression mechanism 34, just as was the case before the capacity of second compression mechanism 34 was reduced.

Second stage compression mechanism 34 compresses the refrigerant gas until a new gas cooler pressure as represented by state 4r is achieved. As can be seen in FIG. 4, the gas cooler pressure in the reduced capacity cycle is lower than the gas cooler pressure in the higher capacity cycle. States 5 and 5r represent the thermodynamic state parameters at the outlet of heat exchanger 40. The high pressure carbon dioxide gas is cooled within heat exchanger 40 by the low pressure carbon dioxide exiting evaporator 44 before entering first compression mechanism 32. The cooling load of heat exchanger 40 in the cycle 1-2r-3r-4r-5r-6r-1 is substantially unchanged as compared to the cooling load of heat exchanger 40 in the reference cycle 1-2-3-4-5-6-1.

It can be seen in FIGS. 3 and 4 that the curvatures or slopes of the isotherm curves vary with enthalpy. The slope of an isotherm curve is related to the specific heat of the refrigerant at that point in the cycle. More particularly, at points of inflection of the isotherm curves, i.e., where the slopes of the curves are at a minimum, the specific heat of the carbon dioxide has a maximum value. The dashed line I in FIG. 4 intersects the points of inflection of the isotherm curves where the specific heat of the carbon dioxide is greatest. Line I is modeled as being linear in FIG. 4, however, it is possible that line I is nonlinear.

The efficiency of system 30 is improved when point 5 is close to line I, where the specific heat of the refrigerant is at a maximum. When the specific heat of the refrigerant is high, the refrigerant experiences less temperature increase when transferring heat to the air flowing over gas cooler 38. Thus, the temperature difference between the refrigerant in gas cooler 38 and the surrounding air remains high, thereby maintaining a high rate of energy transfer from gas cooler 38 to the air, and increasing the efficiency of system 30. As can be seen in FIG. 4, point 5r is closer to line I than is point 5. Thus, the reduction in capacity of second compression mechanism 34 results in an increase in the efficiency of system 30 for the load under which system 30 is operating in FIG. 4.

A constant cooling load of exchanger 40 and an increased specific heat indicates that the high pressure carbon dioxide gas experiences less temperature change in moving from point 4r to point 5r than in moving from point 4 to point 5. As the capacity of second compression mechanism 34 is reduced, the pressure within gas cooler 38 also falls until it reaches an equilibrium value where the average density of the carbon dioxide gas within gas cooler 38 between points 4r and 5r is equal to the former average density of the carbon dioxide gas within gas cooler 38 between points 4 and 5.

It can be seen in the embodiment of FIG. 4 that the average temperature of the carbon dioxide gas after the capacity reduction of second compression mechanism 34 is less than the average temperature of the carbon dioxide gas before the capacity reduction, due mostly to the large temperature drop from point 4 to point 4r at the output of second compression mechanism 34. A consequence of the drop in average temperature is that the average density of the carbon dioxide in gas cooler 38 increases, and thus gas cooler 38 contains a greater quantity of carbon dioxide. Accordingly, the present invention provides a way of controlling the gas cooler pressure that is an alternative to various techniques for changing the total amount of carbon dioxide refrigerant charge in the system. In the present invention, the increase in the quantity of high pressure carbon dioxide gas within gas cooler 38 is compensated for by a resulting reduction in the gas cooler pressure, which in turn reduces the carbon dioxide gas density.

The present invention allows the gas cooler pressure to vary without any variation of the pressure within evaporator 44. The range of variation in the gas cooler pressure can be modified by setting the average high pressure carbon dioxide gas density of the reference cycle, i.e., the cycle without any reduction in the capacity of second compression mechanism 34. Setting the average high pressure carbon dioxide gas density of the reference cycle can be accomplished by varying the amount of carbon dioxide gas charge in the system.

In operation, the illustrated embodiment of system 30 is a transcritical system utilizing carbon dioxide as the refrigerant wherein the refrigerant is compressed above its critical pressure and returns to a subcritical pressure with each cycle through the vapor compression system. Liquid refrigerant enters expansion device 42 at the supercritical pressure. The pressure of the refrigerant is lowered to a subcritical pressure as the refrigerant progresses through device 42, and a portion of the liquid refrigerant boils such that the refrigerant enters a two-phase state.

The efficiency of the system will vary with changes in the pressure in gas cooler 38. However, gas cooler pressures that correspond to the optimal efficiency of system 30 and the maximum capacity of system 30 will generally differ.

By regulating the capacity of second compression mechanism 34, the pressure along the gas cooler 38 can be controlled and, thus, the capacity and efficiency of system 30 can be controlled. Controller 48 may modify the capacity of second compression mechanism 34 by various means including adjusting a constant level of voltage applied to second compression mechanism 34, thereby adjusting the speed of the compressor. Another way of controlling the capacity of second compression mechanism 34 is by turning on/off the voltage to the compressor or compressors that perform the second stage compression. That is, the voltage to the compressor(s) can be pulse width modulated to thereby provide a lower effective level of voltage to the compressor(s), thereby also reducing the speed and capacity of the compressor(s). Yet another possible way of controlling the capacity of second compression mechanism 34 is by forming second compression mechanism 34 of a series of individual compressors, and bypassing a selected number of the individual compressors to thereby achieve a desired capacity.

The capacity of second compression mechanism 34 can be modified based upon changes in the cooling load, as evidenced by temperatures associated with system 30, such as measured temperatures in the refrigerated cabinet or at the output of evaporator 44, for example. The measured temperatures can be communicated to controller 48. If these measured temperatures are higher than desired, the capacity of second compression mechanism 34 can be raised in order to lower the temperatures. Conversely, if these measured temperatures are lower than desired, the capacity of second compression mechanism 34 can be lowered in order to raise the temperatures.

The system 30 has been shown herein as including a heat exchanger 40. However, it is to be understood that it is also possible within the scope of the present invention for the vapor compression system to not include a heat exchanger 40.

The system 30 has also been shown herein as having an equal mass flow rate in each of compression mechanisms 32 and 34. However, it is also possible, by use of more complex circuitry, for the mass flow rates in compression mechanisms 32 and 34 to be different. For example, an optional flash gas tank 46 may be connected at one of various points in the fluid circuit to thereby create different mass flow rates in the first and second compression stages. Flash gas tank 46 may hold a mass of refrigerant that varies in response to changes in the operation of second compression mechanism 34.

Figure 5:
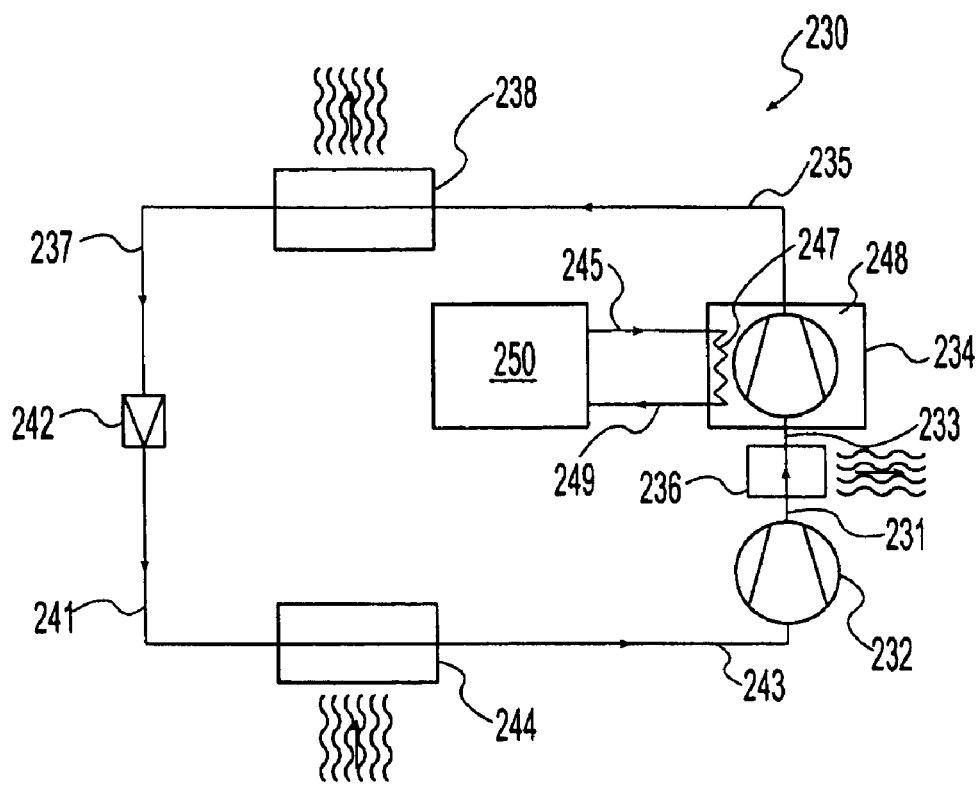
FIG. 5 is a schematic view of another embodiment of a vapor compression system of the present invention.

In other embodiments of the present invention, the capacity and efficiency of the compressors can be raised by cooling the refrigerant not only in the intercooler but also during compression. A second embodiment 230 of a vapor compression system in accordance with the present invention is schematically represented in FIG. 5. System 230 includes a fluid circuit circulating refrigerant in a closed loop. System 230 has a two stage compressor having a first compression mechanism 232 with a non-variable capacity and a second compression mechanism 234 which may have either a controllable and variable capacity or a non-variable capacity. First compression mechanism 232 compresses the refrigerant from a suction pressure to an intermediate pressure. An intercooler 236 is positioned between the first and second compression mechanisms and cools the intermediate pressure refrigerant. Second compression mechanism 234 then compresses the refrigerant from the intermediate pressure to a discharge pressure that exceeds the critical pressure of the refrigerant, i.e., a supercritical pressure. Compression mechanisms 232, 234 may be any suitable type of compression mechanisms such as a rotary, reciprocating or scroll-type compressor mechanisms.

The refrigerant is then cooled in a heat exchanger that can be in the form of a conventional gas cooler 238 which can cool the refrigerant discharged from second compression mechanism 234. The pressure of the refrigerant can be reduced from a supercritical pressure to a relatively lower pressure, preferably a subcritical pressure, by an expansion device 242.

The capacity and efficiency of such a transcritical system can be regulated by regulating the pressure of the high pressure portion, e.g., the pressure in gas cooler 238, of the system. The pressure of the high side gas cooler may, in turn, be regulated by regulating the mass of refrigerant contained therein which is dependent upon the total charge of refrigerant actively circulating through the system.

After the pressure of the refrigerant is reduced by expansion device 242, the refrigerant enters another heat exchanger in the form of an evaporator 244 positioned in a low pressure side of the fluid circuit. The refrigerant absorbs thermal energy in the evaporator 244 as the refrigerant is converted from a liquid phase to a vapor phase. The evaporator 244 may be of a conventional construction well known in the art. The refrigerant is then returned to first compression mechanism 232 and the cycle is repeated.

Schematically represented fluid lines or conduits 231, 233, 235, 237, 241, and 243 provide fluid communication between first compression mechanism 232, intercooler 236, second compression mechanism 234, gas cooler 238, expansion device 242, evaporator 244 and first compression mechanism 232 in serial order. The fluid circuit extending from the output of the first compression mechanism 232 to the input of the first compression mechanism 232 has a high pressure side and a low pressure side. The high pressure side extends from the output of first compression mechanism 232 to expansion device 242 and includes conduit 235, gas cooler 238 and conduit 237. The low pressure side extends from expansion device 242 to first compression mechanism 232 and includes conduit 241, evaporator 244 and conduit 243.

System 230 also includes a heat exchanger 250 for circulating a cooling fluid medium through a housing 248 of second compression mechanism 234. More particularly, a cooling fluid such as oil, water, or forced air, for example, is directed or circulated through a conduit 245, through an internal conduit 247 in housing 248, through a conduit 249, and back to heat exchanger 250. Conduit 247 may possibly be machined or cast within the walls of housing 248. By removing heat from housing 248, heat exchanger 250 also cools the refrigerant being compressed in second compression mechanism 234. Thus, for a same compressed volume, the gas exiting second compression mechanism 234 has a lower temperature than if the gas were not cooled during compression.

Since the work done by the compressors is directly related to the temperature of the refrigerant gas that is compressed, the increased cooling during compression of the refrigeration cycle can result in less work being done by second compression mechanism 234 and an overall energy savings. Moreover, cooling the refrigerant during compression can increase the efficiency of the compressor while at the same time the capacity is reduced. Thus, cooling the refrigerant during compression can compensate for the efficiency losses of a compressor that is sized for a large cooling load but that has to operate at a low load.

Heat exchanger 250 may include some type of pump for circulating the fluid through conduits 245, 247, 249. Heat exchanger 250 may also include a heat sink and a fan or some other device for forcing air across the heat sink. The amount of cooling performed by heat exchanger 250 may be varied by changing the speed of the pump and/or the speed of the fan, for example.

The pressure within gas cooler 238 can be controlled by varying the temperature of the gas, and thus the density of the gas in the cooler. When the gas is cooled during compression, the temperature of the gas entering gas cooler 238 is lower. The lower temperature gas is more dense, and thus the pressure within the fixed volume gas cooler 238 is reduced. By controlling the pressure within gas cooler 238, the capacity and efficiency of system 230 can be controlled.

The use of heat exchanger 250 may possibly eliminate the need for an intercooler, such as intercooler 236, to operate at the most efficient level. Thus, gas cooler 236 may be an optional component in the embodiment of FIG. 5.

Figure 6:
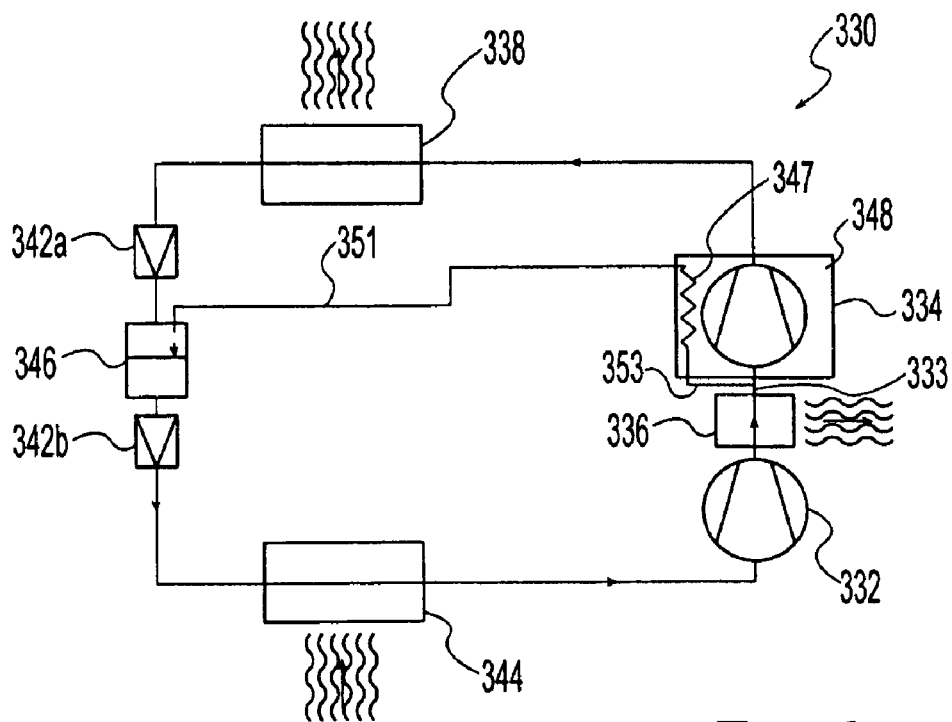
FIG. 6 is a schematic view of yet another embodiment of a vapor compression system of the present invention.

A third embodiment 330 of a vapor compression system in accordance with the present invention is schematically represented in FIG. 6. System 330 has a two stage compressor having a first compression mechanism 332 with a non-variable capacity and a second compression mechanism 334 which may have either a controllable and variable capacity or a non-variable capacity. An intercooler 336 is positioned between the first and second compression mechanisms and cools the intermediate pressure refrigerant.

The refrigerant is cooled in a heat exchanger that can be in the form of a conventional gas cooler 338 which can cool the refrigerant discharged from compression mechanism 334. The pressure of the refrigerant can be reduced from a supercritical pressure to a relatively lower pressure, preferably a subcritical pressure, by an expansion device 342a.

A mass storage tank or flash gas vessel 346 receives the refrigerant gas from expansion device 342a. Flash gas vessel 346 stores both liquid phase refrigerant and vapor phase refrigerant. Vessel 346 is in fluid communication with a conduit 347 in second compressor housing 348 via a fluid conduit 351. An opposite end of conduit 347 is in fluid communication with conduit 333 via another fluid conduit 353.

The capacity and efficiency of such a transcritical system can be regulated by regulating the pressure of the high pressure portion, e.g., the pressure in gas cooler 338, of the system. The pressure of the high side gas cooler may, in turn, be regulated by regulating the mass of refrigerant contained therein which is dependent upon the total charge of refrigerant actively circulating through the system.

Flash gas vessel 346 is in fluid communication with a second expansion device 342b, wherein refrigerant gas undergoes additional expansion. After the pressure of the refrigerant is reduced by expansion device 342b, the refrigerant enters another heat exchanger in the form of an evaporator 344 positioned in a low pressure side of the fluid circuit. The refrigerant absorbs thermal energy in the evaporator 344 as the refrigerant is converted from a liquid phase to a vapor phase. The refrigerant is then returned to first compression mechanism 332 and the cycle is repeated.

Flash gas vessel 346 is in fluid communication with housing 348, and can provide refrigerant gas for the interior of cooling housing 348 via conduit 351. After flowing through housing 348, the refrigerant gas enters conduit 333 and is subsequently compressed by second compression mechanism 334. By removing heat from housing 348 and mixing in with the refrigerant in conduit 333, the refrigerant in conduits 351, 347 and 353 lowers the temperature of the refrigerant that is compressed in second compression mechanism 334. Thus, for a same compressed volume, the gas exiting second compression mechanism 334 has a lower temperature than if the gas did not flow through conduits 351, 347 and 353.

It is also possible for the total refrigerant charge in system 330 to be adjusted by adding or removing refrigerant from vessel 346. More particularly, an additional conduit and possibly valving (not shown) can be added to vessel 346 in order to add refrigerant to or withdraw refrigerant from vessel 346 in order to change the total refrigerant charge in system 330. By changing the amount of refrigerant charge in system 330, the pressure in gas cooler 338 and thus the capacity and efficiency of system 330 can be controlled.

The flash gas vessel 346 can be optimized to ensure that vessel 346 does not separate the liquid and vapor of the two-phase refrigerant that the vessel 346 receives from the expansion device 342a. Alternatively, it may be desirable to ensure that the refrigerant leaves the vessel 346 with the same liquid/vapor ratio with which refrigerant enters the vessel 346. There are several possible methods of ensuring that the liquid/vapor ratio does not change in the vessel 346. A first of these methods is to constantly stir the liquid/vapor mixture of refrigerant once the refrigerant has entered the vessel 346. A second method is to heat or cool the vessel 346 to ensure that the correct liquid/vapor ratio of refrigerant leaves the vessel 346. A third method is to provide the vessel 346 with physical characteristics that promote mixing of the liquid and vapor. Such physical characteristics may include the shape of the vessel 346 and the locations of the vessel's inlet and outlet.

It is also possible to use the vessel 346 as an accumulator. A switch (not shown) can be provided to allow the vessel 346 to accumulate until the mixture stored therein has a predetermined ratio of liquid to vapor. More particularly, a gate (not shown) can be provided at the outlet of the vessel 346 such that only refrigerant mixtures having at least a minimum liquid/vapor ratio can push the gate open, release the refrigerant mixture from the vessel 346, and stop accumulation. Alternatively, a button (not shown) can be provided to support one of the expansion devices. When the refrigerant mixture in the expansion device has at least a minimum liquid/vapor ratio, the weight of the expansion device can actuate the button, thereby opening or closing a gate to begin or end accumulation. As another alternative, a thermocouple or thermostat (not shown) can be provided on an expansion device to detect the quality of the refrigerant's liquid/vapor mixture and trigger the decision to either store or release refrigerant from the vessel 346 by heating or cooling.

Other aspects of system 330 are substantially similar to those of systems 30 and 230, and thus will not be discussed in detail herein.

In another embodiment (not shown) similar to the embodiment of FIG. 6, refrigerant gas from a flash gas vessel such as flash gas vessel 346 is directed into the housing of the first compression mechanism rather than into the housing of the second compression mechanism as shown in FIG. 6. After exiting the housing, the refrigerant can be directed into the fluid circuit at any of various locations, including the discharge outlet of the first compression mechanism, the suction inlet of the second compression mechanism, or, if using an additional expansion device, the suction inlet of the first compression mechanism or the outlet of the evaporator.

Figure 7:
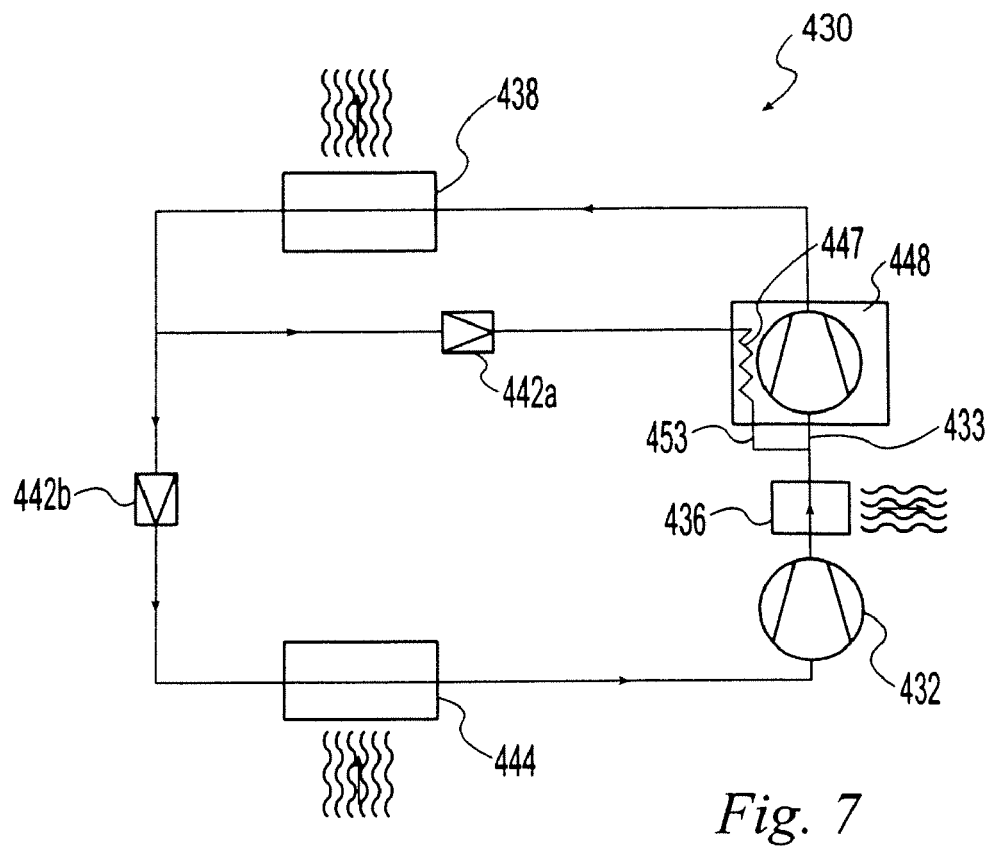
FIG. 7 is a schematic view of a further embodiment of a vapor compression system of the present invention.

A fourth embodiment 430 of a vapor compression system in accordance with the present invention is schematically represented in FIG. 7. System 430 is substantially similar to system 330 except that system 430 contains a fixed refrigerant charge amount. After gas cooler 438, the fluid circuit has two branches. In a first branch, the refrigerant is expanded in expansion device 442a before flowing through conduit 447 to cool housing 448, flowing through conduit 453, and entering conduit 433. In a second branch, the refrigerant is expanded in expansion device 442b before being boiled in evaporator 444, being compressed in first compression mechanism 432, being cooled in intercooler 436, and entering conduit 433 where the two branches converge.

Other aspects of system 430 are substantially similar to those of system 330, and thus will not be discussed in detail herein. In both system 330 and system 430, the use of gas exiting the gas cooler for cooling the gas during compression reduces the cooling capacity of the evaporator by reducing the total amount of refrigerant circulating through the evaporator.

In another embodiment (not shown) similar to the embodiment of FIG. 7, an expansion mechanism such as expansion mechanism 442a directs the refrigerant gas expanded from the outlet of the gas cooler into the housing of the first compression mechanism rather than into the housing of the second compression mechanism as shown in FIG. 7. After exiting the housing, the refrigerant can be directed into the fluid circuit at any of various locations, including the suction inlet of the first compression mechanism, the outlet of the evaporator, the discharge outlet of the first compression mechanism, or the suction inlet of the second compression mechanism.

Figure 8:
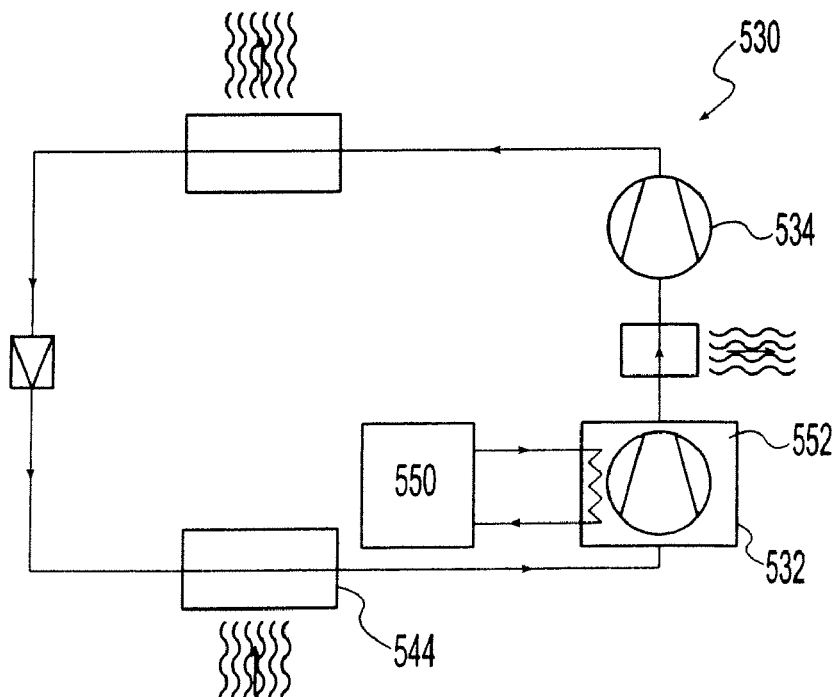
FIG. 8 is a schematic view of a still further embodiment of a vapor compression system of the present invention.

A fifth embodiment 530 of a vapor compression system in accordance with the present invention is schematically represented in FIG. 8. System 530 is substantially similar to system 230 except that system 530 includes a heat exchanger 550 that cools a housing 552 of first compression mechanism 532 instead of a housing of second compression mechanism 534.

Heat exchanger 550 has multiple purposes. A first purpose is to control the cooling capacity of evaporator 544. A lower temperature of the refrigerant gas exiting first compressor mechanism 532 results in a lower gas temperature at the suction inlet to second compression mechanism 534, and thus a lower discharge temperature of second compression mechanism 534 and a reduction in evaporator cooling capacity.

A second purpose of heat exchanger 550 is to control the intermediate pressure at which first compressor mechanism 532 discharges. The refrigerant gas temperature at the suction inlet to second compression mechanism 534 sets the intermediate pressure when compression mechanisms 532, 534 both include positive displacement compressors.

In another embodiment (not shown), both the first and second compression mechanisms are associated with a respective heat exchanger that is similar to heat exchangers 250, 550. This embodiment allows better control of both the evaporator cooling capacity and the intermediate pressure between the compression mechanisms.

The embodiments of FIGS. 5-8 are all shown as including an intercooler between the compression mechanisms. However, it is to be understood that the cooling of one or both of the compressor housings may eliminate the need for an intercooler in these embodiments.

The embodiments of FIGS. 5-8 are all shown as including two compression stages. However, it is to be understood that in systems including only a single compression stage, the housing of the single compressor may be cooled as described above with reference to FIGS. 5-8 to thereby achieve many of the same advantages. Further, in systems including three compression stages, the housings of one, two, or all three of the compressors may be cooled as described above with reference to FIGS. 5-8 to thereby achieve many of the same advantages.

As described above, a refrigeration system may have one variable compression stage and one non-variable compression stage so that the variable compression stage can be adjusted to thereby control the capacity and efficiency of the system. In such systems, one or both of the compressor housings may be cooled in order to further control the system capacity and efficiency. It is also possible, in a refrigeration system having only non-variable compression stages, for the system capacity and efficiency to be controlled by cooling one or more of the compressor housings.

While this invention has been described as having an exemplary design, the present invention may be further modified within the spirit and scope of this disclosure. This application is therefore intended to cover any variations, uses, or adaptations of the invention using its general principles.

What is claimed is:

1. A method of changing system cooling capacity in a transcritical vapor compression system without changing the mass flow rate through the system, said method comprising:
   providing a fluid circuit circulating a refrigerant in a closed loop, the fluid circuit having operably disposed therein, in serial order, a first compressor, an intercooler, a second compressor, a first heat exchanger, an expansion device and a second heat exchanger;
   compressing the refrigerant from a low pressure to an intermediate pressure in said first compressor;
   then compressing the refrigerant from the intermediate pressure to a supercritical pressure in the second compressor;
   then decreasing the temperature of the refrigerant in the first heat exchanger;
   then passing the refrigerant through the expansion device and reducing the pressure of the refrigerant in the expansion device;
   then passing the refrigerant through a second heat exchanger to the inlet of the first compressor; and
   while holding the capacity of the first compressor constant, one of reducing or increasing the capacity of the second compressor to thereby increase or decrease, respectively, the pressure and density of the refrigerant in the intercooler which reduces or increases, respectively, the supercritical pressure of the refrigerant in the first heat exchanger to thereby increase or decrease, respectively, the enthalpy of the refrigerant at the output of the expansion device such that the cooling capacity of the system is decreased or increased, respectively, without changing the mass flow rate through the system.

2. The method of claim 1 comprising the further step of reducing the temperature of the refrigerant within one of said compressors by means of a further heat exchanger in thermal contact with said one compressor.

3. The method of claim 1 wherein the refrigerant comprises carbon dioxide.

4. The method of claim 1, wherein the step of reducing or increasing the capacity of the second compressor is accomplished by varying the speed of the second compressor.

5. The method of claim 1, wherein the first compressor is a fixed capacity compressor and the step of reducing or increasing the capacity of the second compressor step is accomplished by varying the speed of the second compressor.

* * * * *

UNITED STATES PATENT AND TRADEMARK OFFICE
CERTIFICATE OF CORRECTION

PATENT NO. : 7,600,390 B2  Page 1 of 1
APPLICATION NO. : 11/145661
DATED : October 13, 2009
INVENTOR(S) : Dan M Manole It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 764 days.

Signed and Sealed this

Fifth Day of October, 2010

David J. Kappos
*Director of the United States Patent and Trademark Office*